United States Patent Office 2,710,810
Patented June 14, 1955

2,710,810

DEHYDRATION OF BIOLOGICAL MATERIALS

Sumner I. Strashun, El Cerrito, Calif., assignor to the United States of America as represented by the Secretary of Agriculture No Drawing. Application August 18, 1953,
Serial No. 375,080

4 Claims. (Cl. 99—199)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the dehydration of biological fluids, particularly microbial liquid cultures such as liquid cultures of bacteria, yeasts, fungi, etc., for use in the preparation of foods, feeds, therapeutic materials, industrial products, antibiotic feed supplements, etc.

Briefly described, the process of this invention involves first evaporating the microbical liquid culture in question under vacuum at a temperature not over about 50 to 150° F. to prepare a liquid concentrate of about from 35 to 80% solids. This concentrate is then dehydrated preferably by maintaining a layer of the concentrate in contact with a heated surface and simultaneously exposing the layer of concentrate to a vacuum, the conditions of temperature being controlled to get rapid dehydration without damage by overheating to the product as more fully explained below. Some of the advantages of the process are listed as follows:

(a) The heat-labile components of the liquid such as enzymes, vitamins, antibiotics, etc. are not damaged.

(b) The dry product is free-flowing and exhibits an extremely high rate of rehydration so that on agitation with water for less than a minute it forms a reconstituted liquid. The product of this invention has a high rate of rehydration because it is made up of a mass of expanded, porous, sponge-like particles and water can readily enter into the interstices and dissolve and disperse the material. The product is completely free from the tendency to form aggregates on contact with water as is the case with spray dried products.

(c) The dehydration in accordance with this invention requires a short period of time—an hour or less using a batch-type dehydration apparatus and a minute or less when using a continuous procedure which involves applying dehydrating conditions to a thin film of concentrate.

(d) The dehydration is accomplished under vacuum. This means that little opportunity for oxidation and consequent destruction of delicate components is afforded.

(e) In the process of this invention, quantitative yields of product are obtained. All the solids put into the process are recovered.

(f) The product in accordance with this invention is self-preserving and can be stored at ordinary temperatures for long periods of time without loss in quality.

A primary factor in the process of this invention is that during the dehydration the concentrate expands (or "puffs") to a large extent and remains in this expanded condition throughout so that the final product is also in the expanded state. This expansion is caused by the entrapment of a multitude of small steam bubbles throughout the mass. As the dehydration proceeds, the moisture is removed and the spaces formerly occupied by the steam bubbles remain as numerous small voids dispersed throughout the mass of dried product. This expansion with its effect of creating the voids in the product is very desirable because the product is in a porous form and is easy to remove from the trays or other surface used to support the material, it breaks up easily into free-flowing small particles or flakes and exhibits an extremely high rate of rehydration so that a reconstituted liquid can be prepared by agitating with water for less than one minute. The high rate of rehydration makes the dry product eminently suitable for further processing treatment, ultimate use, and ease in digestion where the product is used, for example, as a feed supplement. The process of this invention, by causing expansion during dehydration achieves results which cannot be obtained in processes where there is no expansion. Thus in the absence of expansion, the dried product is hard and dense, it is difficult to remove from the trays or other supports and requires grinding to reduce it to particle size. Further, because of its dense nature the unexpanded product will not absorb water readily and reconstitution will be slow and inefficient.

Another important advantage of the expansion, is that it expedites dehydration and minimizes heat damage to the product. Thus when the material expands, moisture can diffuse out of the porous, spongy mass very readily so that the dehydration can be completed in a short time. Such favorable action cannot be obtained if the material would remain constant in volume or shrink during dehydration. In such case moisture diffuses but slowly through the dense mass and the dehydration requires a long period of time—as much as 10 times longer than where extensive expansion occurs. Another advantage of expansion during dehydration is that in the expanded condition there is a pronounced evaporative cooling effect so that the temperature applied for dehydration can be high so as to force a rapid evaporation of moisture without overheating the product. The evaporation of moisture is so rapid that the product temperature remains below the level at which damage would occur despite the fact that the temperature applied to the product to cause evaporation is well above the level at which damage would occur. This situation thus permits one to apply high temperatures to speed the dehydration without at the same time causing damage to the product. Where there is no expansion such favorable conditions do not exist. In such a case the evaporative cooling effect would be minor with the result that the product would assume a temperature close to that of the temperature used to cause dehydration with the result that the dehydration temperature would have to be kept low to prevent overheating the product. As a result the dehydration time would be greatly extended.

For complete understanding of the process of this invention the following detailed description of the process is given as applied to a microbial culture, by way of example.

The culture containing cellular material, products of biosynthesis, residual nutrients, etc. is first subjected to concentration, so that it will be in proper condition for the subsequent dehydration step. The original culture is low in solids content and cannot be subjected directly to the dehydration because it will boil and spatter violently and may not expand properly. On the other hand when the concentrate is applied in the dehydration it expands by entrapping the steam bubbles and little boiling or spattering is obtained. In general the liquid is concentrated as much as possible to still obtain a flowable liquid. Thus the subsequent dehydration step necessitates starting with a liquid concentrate but to decrease expense and time of dehydration as much moisture as possible should be removed during the concentration step to the point of obtaining a concentrate which is still capable of flowing. In many cases a satisfactory concentrate will have a solids content about from 35 to 80%. As conventional in the concentration of heat sensitive fluids, it is preferred to conduct the concentration under vacuum at a temperature not over about 50–150° F., the particular temperature being dependent on the heat sensitivity of the liquid in question, thus to avoid heat damage to the material.

The concentrate as above prepared is then ready for dehydration to the solid state. This dehydration is preferably achieved by the application of vacuum to the concentrate while it is spread on a heated surface. The apparatus used may be of the batch or continuous type. In conducting the dehydration by a batch technique, the concentrate is poured onto trays which are placed in a vacuum drier equipped with hollow shelves through which heating or cooling media can be circulated. The depth of liquid in the trays will depend on the available space between shelves, taking into account the fact that as dehydration proceeds the material will expand in volume up to 20 times. In general, to fully utilize the available space, the liquid level should preferably be such that after expansion it almost contacts the bottom of the shelf immediately above the tray. For example, in a drier having a 2½" space between shelves the concentrate is loaded to a depth of about ⅛" whereby on a 16-fold expansion it will exhibit a final depth of 2" on dehydration.

After inserting the trays containing concentrate into the drier, the drier is closed and vacuum applied, the vacuum being maintained until dehydration is completed. Pressures of around 2 to 20 mm. of Hg are used. Vacuums in this range are easy to obtain with relatively inexpensive equipment such as steam ejectors and require the pumping of relatively small volumes of water vapor as compared with systems using vacuums on the order of several microns where very expensive, efficient vacuum pumps, dry ice traps, etc. are essential. A heating medium is circulated through the hollow shelves to supply heat to the concentrate and evaporate moisture therefrom. The heating medium may be maintained at a temperature in the range from about 100° to about 300° F. To expedite evaporation of moisture and cause extensive expansion of the concentrate, it is usually preferred to apply the higher temperatures in the above range. Thus for example, the shelf temperature may be maintained in the range from about 200° to 300° F. whereby the dehydration is accelerated. Such high temperatures can be applied because the concentrate is cooled by the evaporative process—thus the concentrate itself does not attain the temperature of the shelves. Depending on the degree of vacuum used, the concentrate temperature may rise slightly, remain constant or even decrease. However, as the dehydration proceeds, the rate of evaporation necessarily falls off with the result that the temperature of the concentrate starts to rise. When this happens, the temperature of the heating medium is decreased to a lower level and maintained at the lower level until dehydration is complete. The principle of the dehydration thus involves two distinct stages. In the first stage a high shelf temperature can be used because the rapid rate of evaporation keeps the product temperature down so that it does not suffer decomposition. When the rate of evaporation falls off and the product temperature rises, the second stage is started. At this point the temperature applied to the shelves is reduced so that the product temperature does not rise above the temperature at which decomposition would occur. The temperature which is applied during the second stage of dehydration may in general be from about 80° to about 150° F., the entire heating range thus being from about 80 to 300° F. The particular temperature within this range to be used in any specific instance will depend on the nature of the material being dehydrated. Thus for a product which would be damaged if it were heated to above 125° F., the product temperature during dehydration would be checked from time to time and when it approached 125° F., the shelf temperature would be reduced from the initial high temperature to 125° F. and maintained at that level until dehydration would be complete. A different product might be damaged, say, if it were heated to above 100° F. In such case the second stage of dehydration would be conducted at 100° F. so that the temperature of the product would not exceed that level. It is evident that adaptation of the process to any particular material involves the factor of maintaining the product temperature below the level at which decomposition or damage to the active components would occur. During the first stage of dehydration, as high a temperature should be applied to get as rapid a dehydration as possible, then when the product temperature approaches the temperature at which damage would occur, the temperature applied by the shelves should be dropped so that during the remainder of the dehydration, the temperature of the product is maintained below the temperature of decomposition.

The two-stage dehydration which is employed is advantageous because rapid evaporation of moisture is obtained yet heat damage to the product is minimized. Thus by applying a high temperature to the hollow shelves during the first stage, very rapid evaporation of moisture is obtained whereas the cooling effect of the evaporation keeps the temperature of the product below temperatures at which damage would occur. In the second stage, the shelf temperature is lowered because the rate of evaporation has decreased. However even during this second stage, the product is maintained at a temperature at which evaporation takes place readily and the product temperature is below that at which damage would occur.

When the drying cycle is completed as indicated by the product reaching the same temperature as the shelves thus signifying absence of evaporation, the temperature of the shelves is reduced by circulating cold water through the hollow shelves before breaking the vacuum. The reason for this is to reduce the product temperature to about room temperature, whereby the product loses its plastic character and becomes brittle and easily friable. While the mass is warm, it is plastic and would collapse if the vacuum were broken, whereby it would be difficult to remove from the trays and even if removed would not break up properly. By cooling the mass before releasing vacuum it does not collapse and it becomes easy to remove from the trays and easy to break up. Thus after the product is cooled, the vacuum is broken, the drier opened and the trays removed. By applying a spatula to the trays the product is easily removed, the scraping action of the spatula breaking up the product into a mass of fine flakes. For optimum results it is preferred that the vacuum drier be located in a room in which the atmosphere is regulated at a very low humidity; this will reduce any danger of moisture regain by the product.

Instead of carrying out the dehydration in a batch-type vacuum drier as described above, one may employ a continuous dehydrator such as a belt-type vacuum drier. A suitable apparatus of this type includes an endless flexible metallic belt which travels about two drums, one being heated internally by steam or hot water and the other being cooled by internal circulation of cold water. The belt, drums and associated mechanisms are all located within an air-tight vessel which can be evacuated. A film of the concentrate is applied to the outer surface of the belt by a roller device. This film of concentrate is then transported by the belt about the hot drum whereby the concentrate is heated and rapidly expanded and dehydrated while in its expanded condition by the combined action of the heat and vacuum. The dehydrated film is then transported by the belt about the cold drum whereby the product is cooled to make it lose its plastic character. The cooled product is then scraped off the belt by a doctor blade and is removed from the dehydrator through the use of an air-lock type of receiver. Additional heaters, preferably of the infra-red or other radiant type, may be provided within the dehydrator to apply heat to the film of concentrate before it contacts the hot drum thus to gradually build up the temperature of the film and cause what may be termed a pre-drying of the film. Such action is desirable as thereby the moisture content of the film is lowered and its viscosity is increased whereby to avoid the possibility of collapse of the expanded film on the hot drum due to overheating while the moisture content of the film is high. Radiant heaters may also be provided adjacent the hot drum to expose the upper surface of the film to heat. In this type of operation it is preferred to apply the concentrate to the belt in the form of a thin film having a thickness on the order of 0.006 to 0.02 inch. The use of a thin film makes it possible to obtain very rapid dehydration. Thus the heated drum may be maintained at about 100–300° F. and the belt speed may be regulated so that the dehydration is accomplished in a time of contact between belt and the hot drum on the order of 15 to 60 seconds. Such rapid dehydration is of course desirable as possibility of damage to the product is minimized.

In many cases expansion of the film of concentrate during dehydration is enhanced if an inert gas is incorporated into the liquid concentrate prior to introduction into the vacuum dehydrator. To this end the concentrate may be whipped or agitated in such manner as to incorporate air into it preferably with complete dispersion of the air particles throughout the body of concentrate. Instead of air, other inert gases preferably, gases such as nitrogen or carbon dioxide may be incorporated into the concentrate. It has been observed that where the concentrate is thus gasified, it will expand to a large degree (10–25 times) during dehydration whereas in its ungasified condition the same concentrate may require the addition of a drying aid and/or use of very high vacuum during dehydration to cause expansion to a comparable extent.

In some cases, it is preferred to add a drying aid to the concentrate to enhance expansion of the concentrate during dehydration. Whether or not a drying aid is required depends on the nature of the liquid being dehydrated. In dehydrating microbial cultures, addition of a drying aid will usually not be necessary particularly in cases where the culture contains unassimilated sugar or other carbohydrate materials or where the organism elaborates gummy polysaccharide substances. Whether a drying aid is needed can easily be determined by placing a thin layer of the concentrate on the surface of a heater which is surrounded by a bell jar. The interior of the jar is evacuated while the heater surface is brought up to about 200–212° F. The concentrate is observed through the bell jar to see if it expands. If the material expands to a considerable degree, preferably 10–15 times in volume, no drying aid is needed. If the expansion is insufficient, addition of a drying aid is indicated. Suitable drying aids are, for example, sucrose, dextrose, dextrin, gelatin, pectin, sodium carboxymethyl cellulose, methyl cellulose, corn syrup, corn syrup solids, alginic acid or the alkali metal alginates, etc. The amount of drying aid required in any particular instance will depend on the nature of the liquid in question, the degree to which it has been concentrated, the efficacy of the particular drying aid, etc. In general, the proportion of drying aid may be in the range from about 1 to 100% based on the solids in the concentrate. The proper amount of drying aid can easily be determined by the test above described. Instead of adding the drying aid to the concentrate, the fermentation to produce the culture may be carried out with an excess of carbohydrate nutrient (sucrose, glucose, lactose, maltose, molasses, corn syrup, etc.) so that the organism does not assimilate all the carbohydrate and a sufficient quantity thereof remains in the finished culture to act as a drying aid during dehydration.

The invention is further illustrated by the following example.

*Example*

A bacillus, isolated from soil and having the ability to produce antibiotic activity effective to promote the growth of chicks, was grown under aerated, submerged conditions on a beet molasses medium.

The resulting culture (5% solids) was evaporated under high-vacuum, low-temperature conditions to produce a liquid concentrate containing 25% solids.

To two liters of this concentrate was added 500 grams of corn syrup solids (equal proportion of culture solids and corn syrup solids). The concentrate containing corn syrup solids was dehydrated in a vacuum drier equipped with shelves to hold trays of material to be dried, the shelves being hollow so that heating or cooling media could be circulated therethrough. The concentrate was loaded into trays to a depth of about ⅛ inch. The loaded trays were placed in the drier, the drier being then closed and the vacuum apparatus started to maintain a constant vacuum within the apparatus. The initial shelf temperature was 200° F., this temperature being maintained for about one hour. The temperature of the shelves was then dropped to 80° F. and maintained at this level until the product was completely dry. After this was accomplished, cool water was circulated through the shelves and the vacuum broken and the dehydrated culture removed. It was observed that the concentrate expanded about 16 times in volume during dehydration and retained this volume in the final product thus to yield a product which was porous, easy to remove from the shelves and which broke up readily into free-flowing flakes which exhibited a very rapid rate of rehydration when contacted with water.

A portion of the concentrate as described above was dehydrated on a conventional drum dryer operated at atmospheric pressure.

A sample of the whole culture and samples of the vacuum dried and drum dried products were subjected to a streak plate assay to determine the effect of the different drying methods. The following results were obtained:

|  | Maximum dilution which inhibits growth of test organism | |
| --- | --- | --- |
|  | Staph. albus | Staph. flavus |
| Whole culture | 1:30 | 1:100 |
| Vacuum puff dried | 1:30 | 1:100 |
| Drum dried | 1:10 | 1:30 |

Having thus described the invention, what is claimed is:

1. A process for preparing a dehydrated product from a microbial liquid culture which comprises evaporating the culture under vacuum at a temperature not over about 50 to 150° F. to produce a liquid concentrate containing about from 35 to 80% solids, then subjecting a layer of the concentrate to vacuum while applying heat thereto at a temperature in the range from about 80 to 300° F. to cause the concentrate to expand to an extensive degree, maintaining the concentrate in the extensively expanded state while being subjected to such conditions of heat and vacuum until it is dehydrated, thereafter cooling the dehydrated product while maintaining it under vacuum, then releasing the vacuum and collecting the cooled, dehydrated product now in a porous, solid state.

2. The process of claim 1 wherein an inert gas is incorporated into the liquid concentrate prior to application of the vacuum dehydration.

3. A process for preparing a dehydrated product from a microbial liquid culture which comprises evaporating the culture under vacuum at a temperature not over about 50 to 150° F. to produce a liquid concentrate containing about from 35 to 80% solids, then dehydrating the liquid concentrate by the use of a vacuum and a heating medium, the temperature of the heating medium being maintained at about 150 to 300° F. until the concentrate temperature rises to about 80 to 150° F., the temperature of the heating medium being then decreased and maintained at about 80 to 150° F. until dehydration is completed, the concentrate being maintained in an extensively expanded state throughout the dehydration, thereafter cooling the dehydrated product while maintaining it under vacuum, then releasing the vacuum and collecting the cooled, dehydrated product now in a porous, solid state.

4. A process for preparing a dehydrated product from a microbial liquid culture which comprises evaporating the culture under vacuum at a temperature not over about 50 to 150° F. to produce a liquid concentrate containing about from 35 to 80% solids, forming the liquid concentrate into a thin film, continuously transporting said film of liquid concentrate through a zone where it is subjected while under vacuum to contact with a surface heated to about 100 to 300° F., the concentrate being maintained in an extensively expanded state throughout the dehydration, thereafter cooling the dehydrated product while maintaining it under vacuum, then removing from the vacuum the cooled product now in a porous, solid state.

References Cited in the file of this patent

UNITED STATES PATENTS

| | | |
|---|---|---|
| 1,386,360 | Penniman | Aug. 2, 1921 |
| 1,575,762 | Hoffman | Mar. 9, 1926 |
| 1,701,081 | Nilsson | Feb. 5, 1929 |
| 2,202,161 | Miner | May 28, 1940 |
| 2,235,614 | Grelck | Mar. 18, 1941 |
| 2,555,945 | Thomsen | June 5, 1951 |
| 2,567,038 | Stevens | Sept. 4, 1951 |
| 2,576,932 | Garibaldi | Dec. 4, 1951 |
| 2,619,420 | Jukes | Nov. 25, 1952 |
| 2,653,093 | Baer | Sept. 22, 1953 |